United States Patent [19]
Anderson et al.

[11] Patent Number: 5,598,496
[45] Date of Patent: Jan. 28, 1997

[54] OPTICAL FIBER CONNECTOR COMPRISING A GLASS FERRULE, AND METHOD OF MAKING SAME

[75] Inventors: Jerry M. Anderson, Austell, Ga.; Robert W. Filas, Bridgewater; David W. Johnson, Jr., Bedminster, both of N.J.; Norman R. Lampert, Norcross, Ga.; Eliezer M. Rabinovich, Berkeley Heights, N.J.; David N. Ridgway, Conyers, Ga.

[73] Assignee: Lucent Technologies Inc., Murray Hill, N.J.

[21] Appl. No.: 572,359

[22] Filed: Dec. 14, 1995

[51] Int. Cl.$^6$ ............... G02B 6/00; G02B 6/36
[52] U.S. Cl. ............................................. 385/84
[58] Field of Search ................. 385/84, 85, 88, 385/89, 147, 56, 78

[56] References Cited

U.S. PATENT DOCUMENTS

| | | | |
|---|---|---|---|
| 3,912,362 | 10/1975 | Hudson | 385/54 |
| 4,812,009 | 3/1989 | Carlisle et al. | 385/88 |
| 4,850,670 | 7/1989 | Mathis et al. | 385/88 |
| 5,016,963 | 5/1991 | Pan | 385/33 |
| 5,117,473 | 5/1992 | Pan | 385/33 |
| 5,240,488 | 8/1993 | Chandross et al. | 65/3.11 |
| 5,267,340 | 11/1993 | Pan | 385/123 |
| 5,278,928 | 1/1994 | Ueda et al. | 385/78 |
| 5,295,213 | 3/1994 | Ueda et al. | 385/78 |
| 5,371,816 | 12/1994 | Pan | 385/147 |
| 5,379,364 | 1/1995 | Chandross et al. | 385/143 |
| 5,396,572 | 3/1995 | Bradley et al. | 385/78 |
| 5,475,772 | 12/1995 | Hung | 385/11 |

OTHER PUBLICATIONS

"Review Wet Chemical Etching of Silicate Glasses in Hydrofluoric Acid Based Solutions", by G.A.C.M. Spierings, *Journal of Materials Science*, vol. 28 (1993) pp. 6261–6273.

"A Review of the Chemical Reaction Mechanism and Kinetics for Hydrofluoric Acid Etching of Silicon Dioxide for Surface Micromachining Applications", by D. J. Monk et al., *Thin Solid Films*, vol. 232 (1993) pp. 1–12.

"The Effects of Hydrofluoric Acid Etching on the Strength of Glasses", by B. Proctor, *Physics and Chemistry of Glasses*, vol. 3, No. 1, Feb. 1962.

"Increasing the Mechanical Strength of Alumosilicate Glasses by Etching Method", by L. A. Oriva et al., *Sov. J. Opt. Technol.*, vol. 46 (11), Nov. 1979, pp. 696–697.

*Primary Examiner*—Akm E. Ullah
*Attorney, Agent, or Firm*—Eugen E. Pacher

[57] ABSTRACT

The inventive optical fiber connector comprises a glass ferrule that is strengthened by etching of the outer surface of the ferrule, followed by deposition thereon of a protective layer. Exemplarily, the ferrule is a vitreous silica ferrule drawn from a preform that was made by a sol-gel process. The ferrule is etched in buffered HF, and the protective layer is electroless deposited Ni, with a thin layer of Au thereon. Significant strength increases, exceeding 200%, are obtainable, with the strength being relatively unchanged after even a severe abrasion test.

13 Claims, 2 Drawing Sheets

OPTICAL FIBER CONNECTOR COMPRISING A GLASS FERRULE, AND METHOD OF MAKING SAME

FIELD OF THE INVENTION

This invention pertains to optical fiber connectors that comprise a glass ferrule, and to methods of making such connectors.

BACKGROUND OF THE INVENTION

Optical fiber connectors that comprise a glass ferrule are known. See, for instance, U.S. Pat. No. 4,850,670. However, despite considerable potential cost advantage over conventionally used ceramic ferrules, glass ferrules have found only limited use, e.g., in the so-called rotary splice. This general failure to adopt an otherwise advantageous technology is caused at least in large part by the failure of many prior art glass ferrules to meet stringent strength requirements. Indeed, in the rotary splice there is only minimal mechanical stress on the glass ferrule since the rotary splice is assembled and not expected to be disassembled again.

In view of the significant cost savings that could result from the use of glass ferrules in optical fiber connectors, it would be highly desirable to have available glass ferrules having improved strength that can meet the strength requirements for optical fiber connectors.

U.S. Pat. No. 5,295,213 discloses a method of strengthening alkali-containing glass ferrules by ion exchange. The ion exchange method however is not applicable for vitreous silica or PYREX ferrules. On the other hand, it would be desirable to have available, for instance, vitreous silica ferrules that are strong enough for use in optical fiber connectors, since such ferrules can be produced relatively inexpensively with high dimensional accuracy, and will frequently be more abrasion resistant than the prior art alkali-containing glass ferrules.

This application discloses a method of strengthening glass ferrules and protecting the strength of the ferrules, including vitreous silica ferrules, and also discloses optical fiber connectors that comprise the strengthened glass ferrules.

Etching of silicate glass in hydrofluoric acid-based solutions is well known. See, for instance, G. A. C. M. Spierings, J. of *Materials Science*, Vol. 28, pp. 6261–6273 (1993); and D. J. Monk et al., *Thin Solid Films*, Vol. 232, pp. 1–12, (1993). It is also known that the mechanical strength of glass bodies, including silicate glass bodies, can be increased by etching. See, for instance, B. Proctor, *Physics and Chemistry of Glasses*, Vol. 3 (1), pp. 7–27, (1962); and L. A. Oriva et al., *Soviet J. of Optical Technology*, Vol. 46 (11), pp. 696–697, (1979). HF is a conventional silicate glass etchant, but other etchants (e.g., NaOH) are also known.

SUMMARY OF THE INVENTION

The invention is embodied in an article that comprises an improved optical fiber connector, and is also embodied in a method of making the improved connector.

The connector according to the invention comprises a substantially cylindrical glass ferrule having an outer cylinder surface and a center bore that is adapted for receiving therein an optical fiber. The glass ferrule comprises an etched outer cylinder surface, and an adherent protective layer disposed on the etched surface. The layer comprises one or more members of the group consisting of Ni, Cu, Co, Pal, Pt, Au, and Rh. In preferred embodiments the glass ferrule is a high-silica (more than 50% b.w. $SiO_2$) ferrule, the protective layer comprises Ni (e.g., a Ni-P alloy) and Au, and the glass ferrule has average flexural strength that is at least twice the average flexural strength of an otherwise identical unetched ferrule. The average flexural strength of a ferrule is the average flexural strength of a batch of corresponding, nominally identical ferrules.

The method of making the optical fiber connector comprises providing a substantially cylindrical glass body having an outer cylinder surface and a center bore adapted for receiving therein an optical fiber. Significantly, the method further comprises etching the body by contacting at least the outer cylinder surface with an etching composition, and subsequently forming a protective layer on at least the outer cylinder surface, the protective layer comprising one or more members of the group consisting of Ni, Cu, Co, Pd, Pt, Au and Rh.

Although each glass body can correspond to a single ferrule, in preferred embodiments of the inventive method the glass body is a capillary tube of length sufficient to yield, after segmentation, a multiplicity of ferrules. Segmentation will typically occur after formation of the protective layer. Notching, scoring or cutting of the tube before or after etching and layer deposition are envisaged.

DETAILED DESCRIPTION

Figure 1:
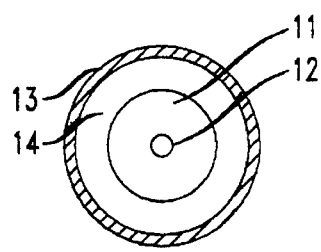
FIG. 1 schematically shows in front view an exemplary ferrule according to the invention.
Figure 2:
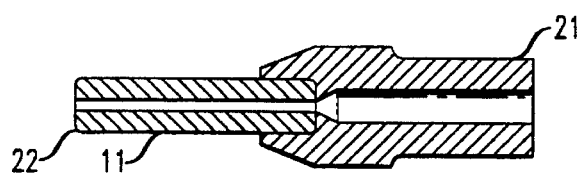
FIG. 2 schematically depicts a ferrule according to the invention with associated base member.

Referring to FIGS. 1 and 2, an optical fiber connector according to the invention typically will comprise a pair of silicate glass ferrules 11 that are adapted for receiving in a central bore 12 an end portion of an optical fiber. Each ferrule will typically be held in a base member 21 that, inter alia, facilitates urging together the ferrules, and a sleeve or other appropriate alignment means maintain the ferrules in axially aligned position. Examples of connectors of the described general type are shown, for instance, in FIGS. 4 and 5 of U.S. Pat. No. 4,850,670, and in U.S. Pat. Nos. 5,396,572, 5,295,213 and 4,812,009, all incorporated herein by reference. However, connectors according to the invention are not limited to the exemplary embodiments, and may take any appropriate form, provided they comprise a glass ferrule that is strengthened as described below. In FIG. 1, numerals 13 and 14 refer, respectively, to the protective layer and an optional chamfer that can facilitate insertion of the ferrule into a sleeve.

In a particular embodiment, vitreous silica ferrules are formed by segmenting a drawn silica capillary body into cylindrical pieces of predetermined length (e.g., 6.5 ram). The capillary body exemplarily is drawn from a silica tubular preform of outer diameter $D_o$ and inner diameter $D_i$, with the resulting drawn capillary body having outer diameter $d_o$ (e.g., 1.249 mm) and inner diameter $d_i$ (e.g., 0.126 ram), with $D_o/D_i$ being approximately equal to $d_o/d_i$ in consequence of the draw process. Adjustment of $D_o/D_i$ to a predetermined value (e.g., by conventional grinding, or by appropriate choice of drawing conditions) is contemplated, as are minor adjustments of the outer diameter of the coated ferrule, e.g., by appropriate selection of the thickness of the protective layer.

The tubular preform can be formed by any appropriate method. Currently preferred is a sol-gel method of making the preform, since this approach can be used to inexpensively produce silica preforms with close dimensional tolerances. The sol-gel method is well known and does not require exposition. See, for instance, U.S. Pat. Nos. 5,240,488 and 5,379,364, both incorporated herein by reference.

Either before or after segmentation of the drawn silica capillary body, at least the outer cylinder surface is subjected to a treatment that can substantially increase the mechanical strength of the ferrules.

As is well known, glass bodies typically do not exhibit their (very high) theoretical strength. This relative weakness is generally ascribed to the presence of flaws or microcracks that can grow under application of a force, leading to failure of the body under relatively small stress.

We have found that glass ferrules can have relatively high strength if they are subjected to an appropriate etch, followed by deposition of an appropriate protective layer on the etched surface. The layer has to be able to withstand repeated make/break cycles of the connector, and thus has to adhere well to the etched glass surface and consist of tenacious material. However, good layer adhesion was difficult to attain. For instance, electroless deposited Ni film adheres relatively poorly to silica etched in concentrated HF or aqueous high HF solutions. Adhesion could be improved by a pre-treatment, after etching but before plating, in a basic solution, but at the cost of weakened silica. However, we have found that some metal films can, without weakening pretreatment, have excellent adhesion to silica etched in low HF aqueous solutions or in buffered HF, and etching in buffered HF is currently preferred. However, other etchants (e.g., NaOH) may also yield satisfactory results. Preferred are also protective films that comprise electroless deposited Ni. For derails on electroless deposition of Ni on silica see, for instance, U.S. Pat. No. 5,380,559, incorporated herein by reference.

In a particular exemplary embodiment of the strengthening treatment, pieces of silica rod 5 inches long, (1.25 or 2.5 mm diameter) were cleaned for 5 minutes in a known cleaning solution (SC-1) of composition 1 part b.v. ammonium hydroxide/1 part b.v. 30% hydrogen peroxide/5 parts b.v. water, at a temperature of 70°–75° C., rinsed in water and treated with sulfuric acid for 5 minutes at 140°–150° C. After rinsing in water and cooling to room temperature, the rods are etched in stirred, commercially available, 7:1 BOE (buffered oxide etch) for an extended period, exemplarily 150 minutes.

The minimum length of etch time will typically depend on parameters such as etchant composition, temperature, and the state of the ferrule surface. Typically the etch time will be selected to remove at least a large fraction of the microcracks such that a desired increase in strength results.

After rinsing in water, the etched surfaces are sensitized with stannous fluoride (1 g/liter of water) for 5 minutes with stirring under nitrogen. After once dipping in deoxygenated water, the surfaces are further activated by treating 5 minutes in stirred 6 g/liter palladium chloride in 0.02 N HCl. After rinsing in water, the rods are placed in a commercially available Ni plating bath (Fidelity 4865) at 85° C. without stirring. Plating time exemplarily was selected to result in formation of an about 5 µm thick layer of P-containing Ni. Typically deposition is monitored (e.g., with a laser micrometer), to terminate the deposition when the exact desired final diameter (e.g., 2.500 mm) is reached. After a water rinse, the rods are put into a commercially available displacement gold bath (Technic, Inc., OROMERSE N) for 10 minutes at 70° C. with stirring. After a final water rinse, the rods are blown dry with nitrogen and are ready for strength testing.

Those skilled in the art will appreciate that ferrules can be produced in essentially the described manner if a capillary body is used instead of the solid rod of the exemplary description. In this case it may be desirable to prevent fluid entry into the central bore, e.g., by heating the ends of the body and pinching closed the central bore. After completion of the strengthening treatment, the capillary body will be cut into ferrules of the desired length.

Those skilled in the art will also appreciate that the above recited conditions are not obligatory, and that some variations of the process may also yield acceptable results. All such variations are contemplated.

Table I shows exemplary 4-point flexural strength results of silica rods etched and coated substantially as described above. The results are average flexural strengths (in $10^3$ pounds/inch$^2$) of a 10-member batch. One pound/in$^2$ corresponds to $6.895 \times 10^3$ Pa.

TABLE I

| HF (concentration) | HF (minutes) | SC-1 (minutes) | POLYMER (kPSI) | Ni—Au (kPSI) | Ni—Au/ Poly. |
|---|---|---|---|---|---|
| — | — | — | 36 | — | — |
| 49% | 2 | 45 | 185 | 54 | 0.29 |
| 10% | 25 | 7.5 | 176 | 73 | 0.41 |
| 10% | 25 | 15 | 124 | 60 | 0.49 |
| 10% | 50 | 15 | 253 | 114 | 0.45 |
| 10% | 50 | 7.5 | 192 | 135 | 0.70 |
| 5% | 100 | — | 228 | 131 | 0.57 |
| 5% | 150 | — | 264 | 143 | 0.54 |
| 7-1 BOE | 100 | — | 245 | 218 | 0.89 |
| 7-1 BOE | 150 | — | 270 | 257 | 0.95 |

The first and second columns show the HF concentration of the etchant and the etching time, respectively. "BOE" refers to a known, commercially available buffered HF etch. The third column shows time in the SC-1 basic cleaning solution. Note that cleaning occurred after etching but before plating. The fourth and fifth columns show the strengths of polymer-coated and Ni-Au coated etched rods. The polymer coating (exemplarily 4 µm GR 653LP-P, a polymer available from Owens-Ill.) was provided to prevent damage to the etched silica surfaces during testing, but is not suitable as a permanent protective coating due to its low abrasion resistance. The Ni-Au coating was 5 µm and 0.15 µm, respectively. The last column presents the ratios of the strength values of the two preceding columns. The first row shows the strength of otherwise identical, unetched rods. The polymer coating does not affect the strength of unetched samples.

As can be seen, the strengths of the polymer-coated rods show generally lower values if the rods were pre-treated in SC-1 than when they were not so pretreated. Low HF, (e.g., less than 10% of HF) and buffered HF generally yielded greatest strength.

The metal-coated rods exhibited lower strengths than the corresponding polymer-coated rods, with the departure from unity of the ratio of the strengths considered to be a measure of the adhesion of the metal layer to the etched surface. Ideally, the metal-coated rods should have the same average strength as the polymer-coated rods. This condition is approached in the BOE-etched rods, indicative of good adhesion of the metal layer to the substantially crack-free silica surface.

In preferred embodiments the process is carried out such that the average flexural strength of the metal-coated ferrules is at least 50% (preferably 100% or even 200% or more) higher than the average flexural strength of, otherwise identical, unetched polymer-coated comparison ferrules. All strength values refer to 20° C. in air.

Table II shows exemplary results of abrasion tests performed on silica rods etched and coated substantially as described above (150 minutes in 7-1 BOE, 5 μm Ni, 0.15 μm Au). The strength data were again obtained by a conventional four-point bend technique. Samples were abraded using a Pilamec Megapot Vibration Pot Mill, using 240 mesh sand. The average strength values are based on batches of 10 rods.

TABLE II

| Abrasion (minutes) | average strength (kPSI) |
| --- | --- |
| 0 | 226 ± 40 |
| 100 | 194 ± 40 |

As can be seen from Table II, the Ni-Au coating protects the silica bodies well against even severe abuse. The decrease of average strength from 226 to 194 kPSI is within the error limits. Even if the observed 14% loss in strength after 100 minutes in the abrasion tester is a real effect, the decrease is modest, given the severity of the abuse. Neither optical microscopy nor gravimetric analysis could detect any change in the coated silica bodies after the (100 minutes) abrasion tests.

For comparison, the previously referred-to polymer coating (4 μm) did substantially not protect the silica bodies even for 5 minutes under the same test conditions, and would not be an acceptable coating for connector ferrules.

EXAMPLE I

Ferrules are prepared as follows. A silica tubular preform ($D_o$=9.913 mm, $D_i$=1.000 mm) is prepared by conventional means using a sol-gel process. The preform is drawn by a conventional technique into capillary tubes ($d_o$ =1.249 mm, $d_i$=0.126 mm). A given capillary tube is circumferentially grooved with a diamond wheel shaped to yield a rounded chamfer substantially as shown in FIG. 2 (reference numeral 22). Grooving with a high power laser (e.g., $CO_2$ laser) is also contemplated. The distance between centers of adjacent grooves is 6.5 mm. Subsequent to grooving, the given tube is cleaned, etched in 7:1 BOE, Ni-plated and Au-plated, all as described above. After completion of the strengthening treatment, the grooved tube is segmented into individual ferrules, with the front face of each ferrule optionally polished. The strength of the thus produced ferrules is substantially in accord with the corresponding data of Table I.

Figure 5:
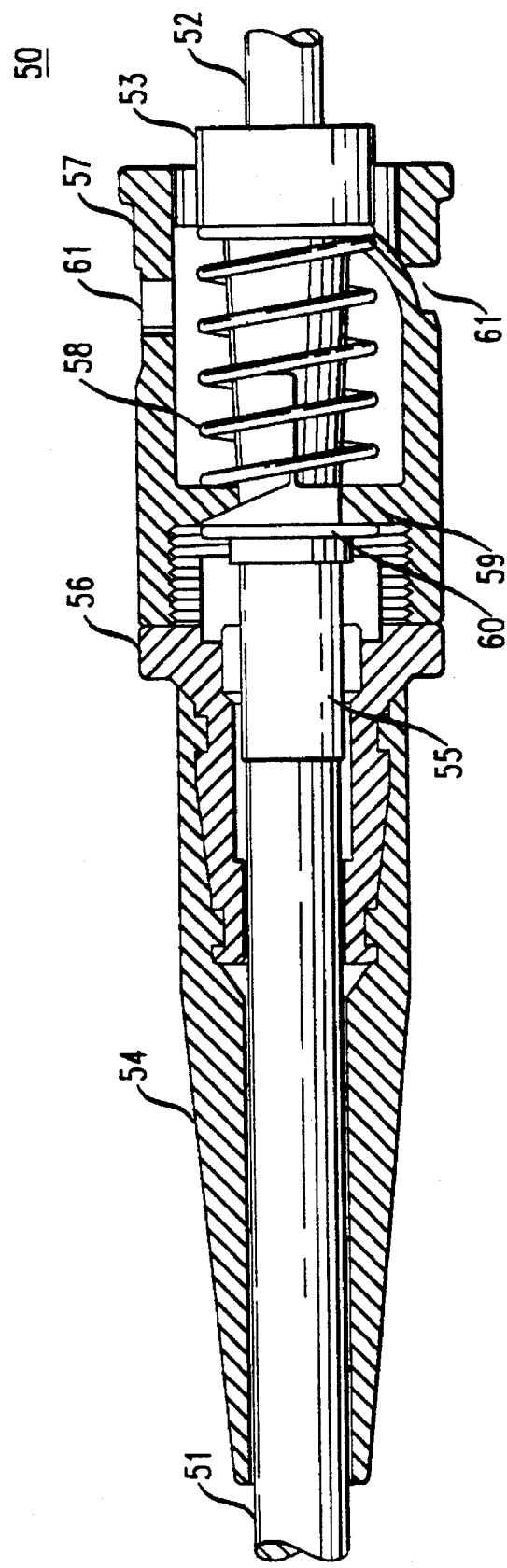
FIG. 5 shows schematically an exemplary connector according to the invention.

The ferrules are inserted into pre-existing base members, substantially as shown in FIG. 2, and the combination is used in the assembly of optical fiber connectors, exemplarily as shown in FIG. 5.

EXAMPLE II

Figure 3:
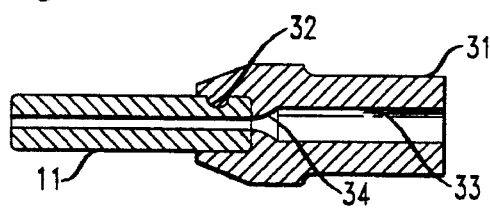
FIG. 3 schematically illustrates a further exemplary ferrule with base member.
Figure 4:
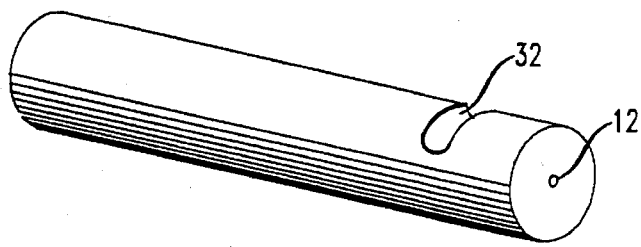
FIG. 4 shows the ferrule of FIG. 3 in perspective view.

Strengthened silica ferrules are prepared as described in Example I, except that a recessed feature (see FIG. 3, numeral 32) is formed in the outer cylinder surface. The feature typically will not extend circumferentially around the ferrule but will have a total length less than $d_o$, and maximum depth substantially less than 0.5 $d_o$ e.g., 0.2 $d_o$, as illustrated in FIG. 4, wherein numeral 32 refers to the feature. Such a feature can readily be made by grinding or laser ablation, at any convenient point in the process, before or after formation of the protective layer. A combination comprising a ferrule and a base member 31 is formed by conventional plastic injection molding, with the plastic flowing into recess feature 32 and securing, after curing, the ferrule with respect to the base member. The base member of FIG. 3 comprises axial bore 33 that is provided to receive a coated optical fiber, with the uncoated fiber end being guided into the axial bore of the ferrule by exit core 34 of the base member. Similar features are shown in FIG. 2. "Substantially cylindrical" ferrules is intended to include, in addition to ferrules that comprise chamfers, feed-in cones and the like, also ferrules that have recessed feature adapted for securing the ferrule to a base member.

Those skilled in the art will recognize that the above disclosed technique for securing a basically cylindrical ferrule to a base member is not limited to glass ferrules according to the invention but can be used with other glass ferrules, including glass ferrules strengthened by ion exchange. Indeed, the approach is not limited to glass ferrules but can be practiced with any other type of substantially cylindrical ferrule that is to be secured to a plastic base member, e.g., a ceramic or metal ferrule. Furthermore, the recessed feature need not be as shown in FIGS. 3 and 4 but could be any depression into which plastic can flow during injection molding of the base member, such that, after curing of the plastic, the ferrule is secured against pull-out from the base member and, typically, is also secured against rotation with respect to the base member.

FIG. 5 depicts, in partial section, one member 50 of an exemplary pair of mating connectors according to the invention. The member is attached to conventional fiber cable 51, the cable comprising an optical fiber (not shown). Glass ferrule (or "plug") 52 according to the invention is joined to base member 53. In this case, cable 51 extends through strain relief member 54 and cap extender 56 into sleeve 55. Cap 57 is secured to the cap extender and encloses the rear portion of the base member, with spring 58 disposed around the rear portion and acting against shoulder 59 of the cap and against the base member. Retaining ring 60 limits the range of axial motion of the base member and attached plug. The exemplary member 50 comprises slots 61 designed to cooperate with studs in the mating member to secure the members together by a bayonette-type arrangement. Other securing schemes are possible. The end portion of the fiber cable is secured to the member by conventional means (not shown), with the bare fiber extending into the central bore of ferrule 52 and secured thereto by conventional adhesive means. The fiber is flush with the ferrule endface. The ferrule of the member and of its mating member are inserted into a conventional coupling housing that comprises a sleeve that serves to axially align the two ferrules, and consequently the two optical fibers. Those skilled in the art will know that member 50 can also be used to connect an optical fiber cable to components (e.g., an optical transmitter or receiver package) other than another optical fiber.

The exemplary member of FIG. 5 corresponds to a connector described in greater detail in U.S. Pat. No. 4,812,009. By way of further example, strengthened ferrules according to the invention could be substituted for ferrules 110 in connectors according to U.S. Pat. No. 5,396,572.

Figure 6:
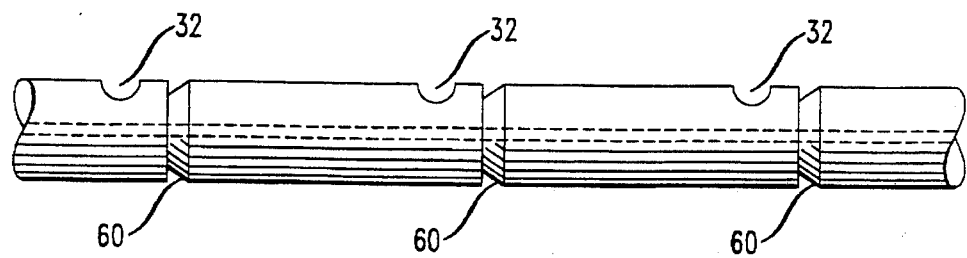
FIG. 6 shows a notched glass body before separation into a multiplicity of ferrules.

FIG. 6 shows a portion of a substantially cylindrical glass body with a central bore and a plurality of spaced apart notches 60. The notches facilitate separation of the body into a plurality of ferrules. Separation typically (but not necessarily) will take place after etching and layer formation.

It is known that pristine drawn glass bodies can have very high strength. It is thus at least in principle possible to form glass ferrules by depositing the appropriate protective coating on the capillary body after drawing thereof, taking care to avoid contacting the surface before application of the coating. However, this approach is currently not preferred.

The invention claimed is:

1. An article comprising an optical fiber connector, the connector comprising a substantially cylindrical glass ferrule having an outer cylinder surface and a center bore adapted for receiving therein an optical fiber;
CHARACTERIZED IN THAT
   the outer cylinder surface comprises an etched surface, and a protective coating is disposed on the etched surface, the protective coating comprising one or more elements selected from the group consisting of Ni, Cu, Co, Pd, Pt, Au and Rh.

2. Article according to claim 1, wherein the glass ferrule contains at least 50% b.w. $SiO_2$, and the layer comprises Ni.

3. Article according to claim 2, wherein disposed on the Ni-comprising layer is a Au-comprising layer.

4. Article according to claim 1, further comprising a length of optical fiber, an end portion of said length being positioned in said center bore and fixed to the glass ferrule.

5. Article according to claim 1, wherein the glass ferrule has average flexural strength at least 50% larger than the average flexural strength of an otherwise identical unetched comparison ferrule.

6. Method of claim 5, wherein the glass ferrule is a vitreous silica ferrule having average flexural strength at least 200% greater than the average flexural strength of an otherwise identical unetched comparison ferrule.

7. Method of making an optical fiber connector that comprises a glass ferrule, the method comprising
   a) providing a substantially cylindrical glass body having an outer cylinder surface and a center bore adapted for receiving therein an optical fiber;
CHARACTERIZED IN THAT the method further comprises
   b) etching the body by contacting at least the outer cylinder surface with an etching composition; and
   c) forming a protective layer on at least the outer cylinder surface, the protective layer comprising one or more elements selected from the group consisting of Ni, Cu, Co, Pd, Pt, Au and Rh; and
   d) carrying out one or more further steps towards making the glass ferrule from the glass body.

8. Method of claim 7, wherein the etching composition comprises HF.

9. Method of claim 7, wherein the etching composition is an alkali-containing composition.

10. Method of claim 8, wherein the glass ferrule comprises at least 80% b.w. $SiO_2$, and the protective layer is selected to comprise Ni.

11. Method according to claim 7, wherein step a) comprises making a glass preform by a sol-gel process, and drawing the substantially cylindrical body from said preform.

12. Method of claim 7, further comprising forming a plurality of spaced apart circumferential notches in the substantially cylindrical glass body.

13. Method of claim 12, wherein steps b) and c) are carried out subsequent to forming the notches, and step d) comprises separating the glass body into a plurality of ferrules.

* * * * *